United States Patent Office 2,916,512
Patented Dec. 8, 1959

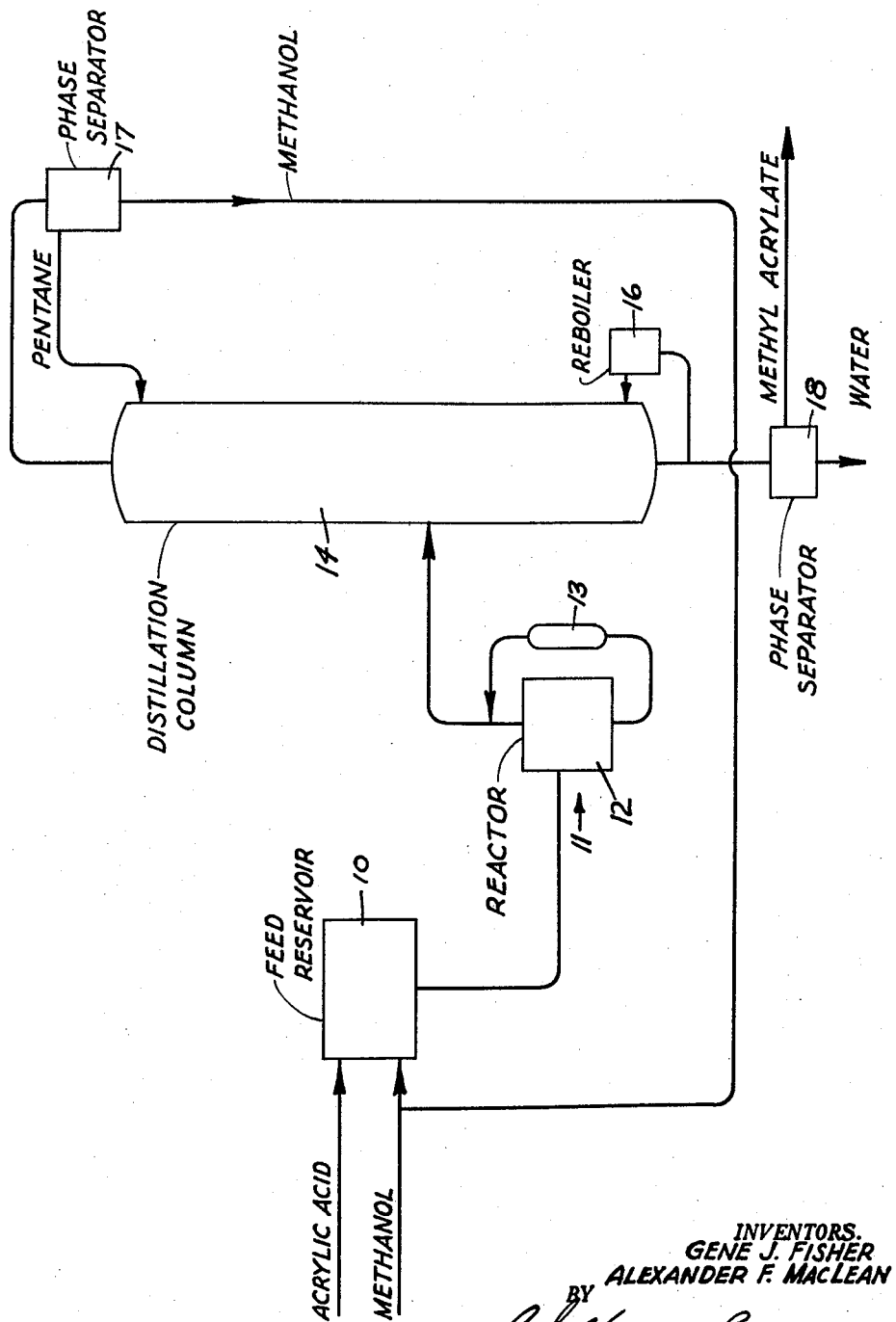

2,916,512

ESTERIFICATION OF ACRYLIC ACID WITH METHANOL

Gene J. Fisher and Alexander F. MacLean, Corpus Christi, Tex., assignors to Celanese Corporation of America, New York, N.Y., a corporation of Delaware Application August 27, 1953, Serial No. 376,952

3 Claims. (Cl. 260—486)

This invention relates to the production of esters and relates more particularly to the continuous synthesis of methyl acrylate.

While the esterification reaction between methanol and acrylic acid to produce methyl acrylate is known, this reaction has not been carried out continuously due to the difficulty of removing the water of reaction from the reacting mixture. More particularly, it has not been possible to remove the water of reaction by distillation in a practical and continuous manner because the lowest boiling component of the reacting mixture is an azeotrope of methanol and methyl acrylate boiling at about 62.5° C. Accordingly, the usual distillation of the reacting mixture removes a reactant, i.e. methanol, and the ester, methyl acrylate, rather than removing the water, so that the water accumulates in the reaction mixture and tends to inhibit further esterification.

It is, therefore, an object of this invention to provide a novel and economical continuous process for the production of methyl acrylate from methanol and acrylic acid.

A further object of this invention is the provision of a novel continuous process for the production of esters from an esterification mixture which mixture comprises one or more reactants which normally distill over from said mixture before the water of reaction distills off.

Other objects of this invention will be apparent from the following detailed description and claims.

In accordance with this invention there is provided a process for the continuous production of an ester from reactants comprising an alcohol and a carboxylic acid, which reactants product an esterification mixture, in which esterification mixture the distillation temperature of at least one of said reactants is lower than the distillation temperature of the water of reaction. The process of this invention comprises continuously feeding the reactants to said esterification mixture and continuously flashing off from said esterification mixture a volatile mixture comprising said more volatile reactant, the ester and the water of reaction while maintaining said esterification mixture at a temperature above the distillation temperature of said volatile mixture.

In accordance with one embodiment of this invention a mixture of methanol and acrylic acid is charged continuously into a reactor maintained at an elevated esterification temperature, e.g. about 75 to 90° C., and vapors of methyl acrylate, water and unreacted methanol are flashed off continuously from the reaction mixture. For best results the mixture charged into the reactor should contain an excess of methanol, e.g. up to 3 moles of methanol for each mole of acrylic acid, and there should also be present in the reactor an esterification catalyst, such as sulfuric acid, and an inhibitor of polymerization, such as methylene blue or hydroquinone.

The vapors flashed off from the reaction mixture are separated advantageously by a process comprising azeotropic distillation. To this end these vapors are led into a distillation column at an intermediate point on said column, i.e. at a point intermediate the top and bottom of the column, while pentane is added to the top portion of said column, at a point above the point of introduction of said vapors. The pentane forms a low-boiling azeotrope with the methanol. This low-boiling azeotrope is distilled from the top of the column and then condensed, forming two phases: a pentane phase, which is returned to the top portion of the column, and a methanol phase which is recycled to the reactor. From the bottom of the column there is withdrawn, as a liquid, an azeotropic mixture of methyl acrylate and water. This mixture also separates into two phases: a water phase and a methyl acrylate phase which is relatively free from water.

If desired, the methyl acrylate phase may be further purified by leading it continuously into a second distillation column, at an intermediate point on said second column, and drawing off substantially pure methyl acrylate as a vapor from a lower intermediate point on said column, i.e. an intermediate point below the point of introduction of the unpurified methyl acrylate phase. The distillate from the second column, comprising methyl acrylate, water, and some methanol, may be passed through a phase separator to remove a portion of the water therefrom and may then be combined with the feed to the first distillation column, i.e. with the vapors flashed off from the reactor. The residue from the bottom of the second column, comprising methyl acrylate, acrylate polymers and the inhibitor, may be further distilled to recover the methyl acrylate contained therein, if desired.

As the reaction proceeds there is a tendency for higher boiling and non-volatile residues to build up in the reactor. These residues comprising methyl acrylate polymer, acrylic acid polymer and the inhibitor, may be removed by drawing off portions of the liquid reaction mixture from the reactor, removing the said higher boiling and non-volatile residues from the drawn off portions, as by distillation, and returning the purified materials to the reactor. The operation of withdrawing portions of the reaction mixture may be carried out continuously, as by withdrawing a stream of said reaction mixture from the reactor. The non-volatile components of this stream should not be over 0.5 to 1% of the total composition of said stream. This stream may be subejcted to distillation to yield first a methanol-methyl acrylate azeotrope, which azeotrope may be added to the vapors flashed off from the reactor, next excess methanol, then water and finally acrylic acid. The methanol and acrylic acid may be added to the streams of methanol and acrylic acid being fed to the reactor.

The accompanying drawing is a diagrammatic flow sheet of one type of apparatus that may be employed in carrying out the process of this invention.

Referring now to the drawing, reference numeral 10 designates a feed reservoir for mixing and storing acrylic acid and methanol. From the feed reservoir 10 the mixture of acrylic acid and methanol flows to a reactor 11 which is in the form of a thermosiphon reboiler comprising a tank 12 connected to one or more heated tubes 13. The reactor 11 initially contains a mixture of methanol, acrylic acid and sulfuric acid or other suitable substantially non-volatile esterification catalyst. The feed of methanol and acrylic acid flows through the tank into the bottom of the heated tube 13, which is maintained at a temperature well above the boiling point of the methanol-methyl acrylate azeotrope. Bubbles of a gaseous mixture of methanol, water and methyl acrylate are formed in the tube 13, which bubbles rise up through said tube carrying the reaction liquid with them, thus establishing a circulation between the tank and the tube. The liquid returns to the tank 12 while the vapors leave the reactor 11 and are led into a vertical distillation column 14 at a point intermediate the top and bottom thereof. Heat is supplied to the bottom of the distillation column 14 by means of a reboiler 16, while pentane is supplied to said column at a point near the top thereof. Vapors of an azeotrope of methanol and pentane emerge from the top of the column 14. These vapors are condensed, the condensate forming two liquid layers which are separated in a phase separator 17, the upper layer, consisting principally of pentane, being returned to the distillation column 14 at a point near the top of said column. The lower layer, consisting principally of methanol, is mixed with fresh methanol and returned to the feed reservoir 10. From the bottom of the distillation column 14 there is obtained continuously a liquid which separates into two layers in a phase separator 18, i.e. an upper layer, consisting principally of methyl acrylate, and a lower water layer.

The following example is given to illustrate the invention further.

*Example*

126 grams of a mixture of 38.3% by weight of methanol, 2.1% by weight of sulfuric acid of specific gravity 1.81 60° F./60° F. and 59.6% by weight of acrylic acid, said mixture also containing 0.10% of methylene blue, is charged to the reactor 11. A solution of 60% by weight of acrylic acid and 40% by weight of methanol, in which solution the molar ratio of methanol to acrylic acid is about 1.5:1, is fed continuously through the feed reservoir 10 to the reactor 11 at atmospheric pressure. The rate of feed, which is regulated automatically to maintain a constant level in the reactor, is about 60 to 70 milliliters per hour. The temperature in the reactor 11 is maintained at 85 to 86° C. The vapors coming off from the reactor 11 are at a temperature of 70° C. and consist of 22.3% of unreacted methanol, 6.92% of water, 70.3% methyl acrylate and a small amount of acid, equivalent to about 0.5% of acrylic acid. These vapors are fed to the 20th tray from the bottom of the distillation column 14, which has 45 trays and is of the Oldershaw type. Liquid pentane is fed to the top tray of said column 14, from the phase separator 17, to strip the methanol off as its pentane azeotrope, which boils at 30.5° C., and the methanol is withdrawn continuously from the bottom of said phase separator 17. If necessary, fresh pentane is added to the separator 17 to make up for any losses thereof. An azeotrope, boiling at 71° C. and comprising methyl acrylate and water, is withdrawn continuously in liquid form from the base of the distillation column 14 and is separated, in the phase separator 18, into two layers, a water layer, representing about 5% of said azeotrope, and an upper layer containing 96% methyl acrylate, 3% water and 0.2% methanol by weight, the remainder consisting principally of acid. The operation of the distillation column 14 is controlled by maintaining a temperature of 70 to 72° C. at the fifth tray from the bottom of said column. The overall efficiency of the process is 89%.

It is to be understood that the foregoing detailed description is given merely by way of illustration and that many variations may be made therein without departing from the spirit of our invention.

Having described our invention, what we desire to secure by Letters Patent is:

1. In the process for the continuous production of methyl acrylate which comprises continuously feeding a liquid mixture of acrylic acid and excess methanol to a zone containing a liquid esterification mixture comprising an esterification catalyst and a polymerization inhibitor, and the volume of said liquid mixture in said zone being maintained constant, the improvement which comprises maintaining said zone at a temperature of about 75° to 90° C., continuously flashing off vapors of a mixture of methyl acrylate, water and unreacted methanol from said zone, and recovering methyl acrylate by continuously leading said mixture of vapors into an intermediate portion of a distillation column, continuously supplying pentane to the top portion of said column, maintaining a constant temperature at a fixed intermediate point in said column, distilling a pentane-methanol azeotrope from the top of said column, condensing said pentane-methanol azeotrope and separating the methanol phase thereof from the pentane phase, returning the pentane phase to the top portion of said column, feeding said separated methanol to said esterification mixture, drawing off a two-phase liquid mixture of methyl acrylate and water from the bottom of said column, and recovering the methyl acrylate phase of said two-phase mixture.

2. In a process for the continuous production of methyl acrylate by continuously feeding a liquid mixture of acrylic acid and excess methanol to a zone containing a liquid esterification mixture comprising an esterification catalyst and the volume of said liquid mixture in said zone being maintained constant, the improvement which comprises continuously flashing off vapors of a mixture of methyl acrylate, water and unreacted methanol from said zone, and recovering methyl acrylate by continuously leading said mixture of vapors into an intermediate portion of a distillation column, continuously supplying pentane to the top portion of said column, distilling a pentane-methanol azeotrope from the top of said column, condensing said pentane-methanol azeotrope and separating the methanol phase thereof from the pentane phase, returning the pentane phase to the top portion of said column, feeding said separated methanol to said esterification mixture, drawing off a mixture of methyl acrylate and water from a point on said column below the point of introduction of said mixture of vapors, said mixture of methyl acrylate and water drawn off from said column separating into two phases, and recovering the resulting methyl acrylate phase.

3. Process as set forth in claim 2 in which said esterification zone is maintained at a temperature of about 75° to 90° C.

References Cited in the file of this patent
UNITED STATES PATENTS

| | | |
|---|---|---|
| 1,770,779 | Horsley | July 15, 1930 |
| 1,998,413 | Reppe et al. | Apr. 16, 1935 |
| 2,406,561 | Rehberg | Aug. 27, 1946 |

OTHER REFERENCES

Groggins: Unit Processes in Organic Chemistry (4th ed., 1952), p. 612.